(12) United States Patent
Sakuwa

(10) Patent No.: US 6,639,645 B2
(45) Date of Patent: Oct. 28, 2003

(54) WARP RESISTANT LIQUID CRYSTAL DISPLAY DEVICE

(75) Inventor: Tohru Sakuwa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 81 days.

(21) Appl. No.: 09/792,350

(22) Filed: Feb. 23, 2001

(65) Prior Publication Data
US 2001/0015787 A1 Aug. 23, 2001

(30) Foreign Application Priority Data
Feb. 23, 2000 (JP) ..................... P2000-046367

(51) Int. Cl.⁷ ................ G02F 1/1333; G02F 1/133; G02F 1/1335; G02F 1/1337
(52) U.S. Cl. ............... 349/158; 349/73; 349/84; 349/96; 349/123
(58) Field of Search ............... 349/73, 74, 96, 349/84, 123, 158

(56) References Cited

U.S. PATENT DOCUMENTS

| | | | |
|---|---|---|---|
| 4,813,770 A | * 3/1989 | Clerc et al. | 349/118 |
| 5,029,985 A | * 7/1991 | Suzuki et al. | 349/155 |
| 5,841,492 A | * 11/1998 | Iwauchi et al. | 349/74 |
| 5,852,487 A | * 12/1998 | Fujimori et al. | 345/104 |
| 6,211,931 B1 | * 4/2001 | Fukao et al. | 349/74 |

FOREIGN PATENT DOCUMENTS

| | | | |
|---|---|---|---|
| JP | 02-228628 | * | 11/1990 |
| JP | 4-238322 | | 8/1992 |
| JP | 06-123892 | * | 5/1994 |
| JP | 06-301027 A | * | 10/1994 |
| JP | 07-168175 | * | 7/1995 |
| JP | 8-54620 | | 2/1996 |
| JP | 08-334738 | * | 12/1996 |
| JP | 11-305040 | | 11/1999 |

\* cited by examiner

Primary Examiner—Tarifur R. Chowdhury
(74) Attorney, Agent, or Firm—David C. Conlin; David A. Tucker; Edwards & Angell, LLP

(57) ABSTRACT

An object of the invention is to provide a liquid crystal display device using plastic substrates in which deformation such as warpage and distortion hardly occurs. The reflection type liquid crystal display device includes a light transmitting plastic substrate and a plastic substrate provided with a reflecting layer. The substrates are positioned facing each other to be kept fixed relative to each other with a predetermined space therebetween defined by spacers or the like. A liquid crystal layer is formed in the space between the substrates and sealed with a sealing agent. A polarizing plate along with an adhesive is attached to the outer surface of the light transmitting plastic substrate, and a polycarbonate substrate along with an adhesive is attached to the outer surface of the reflector-attached plastic substrate.

2 Claims, 1 Drawing Sheet

WARP RESISTANT LIQUID CRYSTAL DISPLAY DEVICE

BACKGROUND OF THE INVENTION

1. Field of the Invention

The present invention relates to a liquid crystal display device using plastic substrates.

2. Description of the Related Art

Liquid crystal display devices including a liquid crystal panel are generally used as displays of watches, calculators, TV sets, personal computers, word processors, navigation systems, instruments, other information apparatus, and terminals thereof. The liquid crystal panel is mainly composed of glass substrates. There is a reflection type liquid crystal display device that has just been put into practical use, where a reflecting layer and a color filter layer are formed on the inner surface of a glass substrate on the back of the liquid crystal panel, while a single polarizing plate is formed on the outer surface of the other glass substrate on the front.

In recent years, for reducing the thickness and weight of the device, it has been proposed to use plastic substrates in place of the glass substrates to construct a reflection type liquid crystal display device as described above. Such a liquid crystal display device using plastic substrates also includes a single polarizing plate on the front of the liquid crystal panel.

The liquid crystal display device using plastic substrates described above has the following problem. The polarizing plate formed on the front of the liquid crystal panel expands and contracts with changes in temperature and humidity. This causes deformation such as warping and distortion in the liquid crystal device, and the entire device is deformed into a propeller-like shape or an irregular shape. Thus, the performance of the liquid crystal display device as a display is obstructed, making it difficult to provide a plastic display having long-term stability. The reason for expansion and contraction of the polarizing plate is that a polarizing film, which is an oriented film, expands and contracts in the orientation axis direction with changes in temperature and humidity.

In order to solve the above problem, Japanese Unexamined Patent Publication JP-A 8-54620 (1996) proposes a method where a plastic substrate having high optical transparency is integrally formed on a surface of a polarizing plate. The polarizing plate is provided on the front or back of a liquid crystal panel having a pair of plastic substrates. Japanese Unexamined Patent Publication JP-A 11-305040 (1999) proposes a method where an ultraviolet curing resin layer is formed on a polarizing plate.

However, the reflection type liquid crystal display device described above, to which the methods disclosed in JP-A 8-54620 and JP-A 11-305040 are applied, is of an asymmetrical structure having a polarizing plate only on the front. With this structure, warping of the polarizing plate is not sufficiently suppressed. As a result, there arises a problem of generating warping and distortion in the liquid crystal display device.

SUMMARY OF THE INVENTION

An object of the invention is to provide a liquid crystal display device using plastic substrates in which deformation such as warpage and distortion does not easily appears.

The invention provides a liquid crystal display device comprising a light transmitting first plastic substrate, a second plastic substrate including a reflecting layer, a liquid crystal layer interposed between the first and second plastic substrates, and a polarizing plate formed on an outer surface of the first plastic substrate, the liquid crystal display device further comprising a third plastic substrate formed on an outer surface of the second plastic substrate.

In a structure having a polarizing plate only on one side of the liquid crystal display device, specifically, on the outer surface of the first plastic substrate, the liquid crystal display device may possibly be deformed as the polarizing plate expands and contracts with changes in temperature and humidity. According to the invention, however, the third plastic substrate, which expands and contracts with changes in temperature and humidity, is formed on the side of the liquid crystal display device opposite to the polarizing plate, that is, on the outer surface of the second plastic substrate. Therefore, when the polarizing plate expands and contracts with changes in temperature and humidity, the third plastic substrate on the second substrate also expands and contracts in the same manner. This suppresses deformation of the liquid crystal display device.

Accordingly, the liquid crystal display device of the invention is prevented from deformation such as warping into a propeller-like shape or distortion into an irregular shape, and thus can be assembled reliably for long-term use. As the third plastic substrate that expands and contracts with changes in temperature and humidity, an oriented plastic substrate made of polycarbonate, for example, or a non-oriented plastic substrate made of an epoxy resin, may be used.

As described above, according to the invention, the third plastic substrate that expands and contracts with changes in temperature and humidity is provided on the outer surface of the plastic substrate provided with the reflecting layer. When the polarizing plate expands and contracts with changes in temperature and humidity, the third plastic substrate also expands and contracts. This suppresses deformation of the liquid crystal display device. Therefore, the liquid crystal display device of the invention has a structure that can remarkably reduce deformation such as warping and distortion generated with changes in temperature and humidity, and can maintain stable quality for a long period of time.

In the invention it is preferable that the third plastic substrate includes an oriented film.

According to the invention, the third plastic substrate formed on the second plastic substrate includes an oriented film. Therefore, the third plastic substrate expands and contracts in the orientation axis direction with changes in temperature and humidity, thereby suppressing deformation of the liquid crystal display device. Examples of the plastic substrate comprising an oriented film include: a plastic substrate made of polycarbonate (PC), for example, where a single film can be oriented; and a substrate including layered oriented films such as oriented polyester (e.g., polyethylene terephtalate (PET)) films.

According to the invention, since the third plastic substrate formed on the outer surface of the second plastic substrate includes an oriented film, the third plastic substrate easily expands and contracts with changes in temperature and humidity. This suppresses deformation of the liquid crystal display device.

In the invention it is preferable that the third plastic substrate including an oriented film is a polarizing plate including a polarizing film.

According to the invention, the third plastic substrate is a polarizing plate including a polarizing film. Therefore, the polarizing plate expands and contracts with changes in temperature and humidity as the polarizing plate formed on the first plastic substrate does. This suppresses deformation of the liquid crystal display device.

Furthermore, in the invention it is preferable that an orientation axis direction of the oriented film is parallel to an orientation axis direction of the polarizing plate formed on the outer surface of the first plastic substrate.

Furthermore, in the invention it is preferable that an orientation axis direction of the oriented film is parallel to an orientation axis direction of a polarizing film of the polarizing plate formed on the outer surface of the first plastic substrate.

According to the invention, the orientation axis direction of the third plastic substrate including the oriented film is parallel to the orientation axis direction of the polarizing plate formed on the first plastic substrate. Therefore, the third plastic substrate expands and contracts in the same directions as the polarizing plate, thereby suppressing deformation of the liquid crystal display device.

According to the invention, the orientation axis direction of the third plastic substrate as a polarizing plate is parallel to the orientation axis direction of the polarizing plate formed on the first plastic substrate. Therefore, the third plastic substrate expands and contracts in the same directions as the polarizing plate formed on the first plastic substrate with changes in temperature and humidity. This suppresses deformation of the liquid crystal display device.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
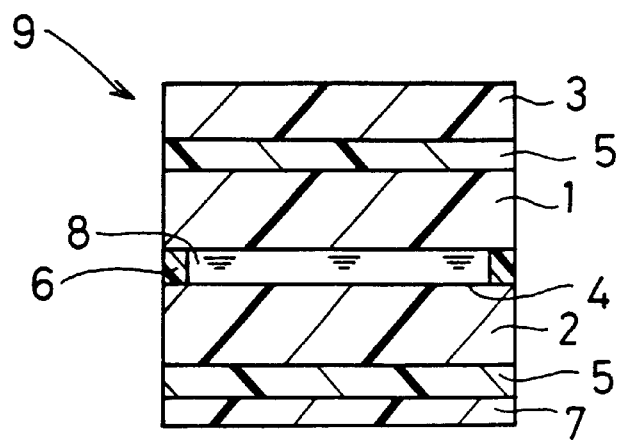
FIG. 1 is a cross-sectional view of a liquid crystal display device of an embodiment of the invention.

Now referring to the drawings, preferred embodiments of the invention are described below.

FIG. 1 is a cross-sectional view of a liquid crystal display device 9 of an embodiment of the invention. The liquid crystal display device 9 includes a light transmitting first plastic substrate 1 and a second plastic substrate 2 provided with a reflecting layer 4. The substrates 1 and 2 are positioned facing each other to be kept fixed relative to each other with a predetermined space therebetween defined by spacers or the like. A liquid crystal layer 8 is formed in the space between the substrates 1 and 2 and sealed with a sealing agent 6. The liquid crystal display device 9 is therefore of a reflection type.

The liquid crystal display device 9 has a size of 82 mm×63 mm, that is, about 3.8 inches. The light transmitting plastic substrate 1 is composed of an optically transparent epoxy substrate having a thickness of 0.4 mm. The reflector-attached plastic substrate 2 is composed of an optically transparent epoxy substrate having a thickness of 0.4 mm. To one surface of the reflector-attached plastic substrate 2, the diffusion reflecting layer 4 is attached in the following manner. A resin layer is formed on one surface of the epoxy substrate, and the surface of the resin layer is roughened. A reflective metal such as aluminum is then evaporated on the roughed surface, thus to complete the diffusion reflecting layer 4. The reflecting layer 4 is not necessarily a diffusion reflecting layer. As the light transmitting plastic substrate, used is an optically transparent substrate typically made of polyester sulfone (PES) having a thickness of about 0.1 mm to about 1 mm.

The light transmitting plastic substrate 1 and the reflector-attached plastic substrate 2 are bonded together with the sealing agent 6 with a predetermined space therebetween so that the reflecting layer 4 is located inside facing the light transmitting plastic substrate 1. To the outer surface of the light transmitting plastic substrate 1, a polarizing plate 3 along with an adhesive 5 is attached so that the polarizing axis thereof is at an angle of 45° with respect to the sides of the liquid crystal display device 9. An example of such a polarizing plate is EG1425DU from Nitto Denko Corp. A polycarbonate (PC) substrate 7, as the third plastic substrate, along with an adhesive 5 is attached to the outer surface of the reflector-attached plastic substrate 2.

The polarizing plate 3 is formed in the following manner. A polymer material such as polyvinyl alcohol (PVA), for example, is allowed to adsorb iodine and the like and oriented in a certain direction to form a polarizing film. The polarizing film is bonded with optically transparent substrates such as cellulose triacetate on both sides to have an integral structure. The polarizing plate 3 including the oriented film therefore easily expands and contracts in the orientation axis direction with changes in temperature and humidity. The substrate 7 made of polycarbonate that is a thermoplastic material also easily expands and contracts with changes in temperature and humidity.

An endurance test was carried out for the liquid crystal display device 9 with the construction described above. The procedure is as follows. First, the liquid crystal display device 9 is placed on a glass plane table with the polycarbonate substrate 7 on the reflector-attached plastic substrate 2 on the bottom, to confirm that the surface is smooth with no bilateral deformation or curling observed. Next, the liquid crystal display device 9 is put in a temperature bath kept at a temperature of 25° C. and a humidity of 60%. After the lapse of 48 hours, the liquid crystal display device 9 is taken out from the temperature bath and placed again on the glass plane table with the polycarbonate substrate 7 on the bottom. The height of the polycarbonate substrate 7 from the glass plane table is measured at positions of both ends of a curl.

As a result, the measured values of the height of the polycarbonate substrate 7 from the glass plane table were in the range of 0.6 mm to 1 mm, indicating that the curl was small. It was therefore proved that this structure did not generate deformation such as curling easily.

Figure 2:
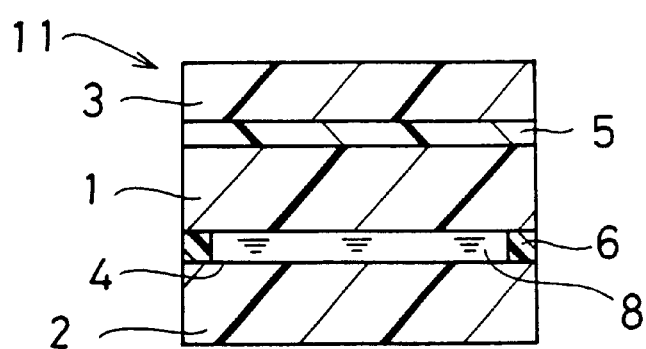
FIG. 2 is a cross-sectional view of a liquid crystal display device including no polycarbonate substrate or an adhesive.

FIG. 2 is a cross-sectional view of a liquid crystal display device 11 that omits the polycarbonate substrate 7. The endurance test described above was carried out for the liquid crystal display device 11. The liquid crystal display device 11 in FIG. 2 has the same construction as the liquid crystal display device 9 in FIG. 1 except that the polycarbonate substrate 7 along with the adhesive 5 is not provided. Therefore, common components are denoted by the same reference numerals, and the description thereof is omitted.

The same endurance test is carried out for the liquid crystal display device 11. First, the liquid crystal display device 11 is placed on a glass plane table with the reflector-attached plastic substrate 2 on the bottom, to confirm that the surface is smooth with no bilateral deformation or curling observed. Next, the liquid crystal display device 11 is put in a temperature bath kept at a temperature of 25° C. and a humidity of 60%. After the lapse of 48 hours, the liquid crystal display device 11 is taken out from the temperature bath and placed again on the glass plane table with the reflector-attached plastic substrate 2 on the bottom. The height of the reflector-attached plastic substrate 2 from the glass plane table is measured at positions of both ends of a curl.

As a result, the measured values of the height of the reflector-attached plastic substrate 2 from the glass plane table were in the range of 1 mm to 2 mm, indicating that the device had greatly curled. This is because the polarizing film of the polarizing plate 3 expanded and contracted due to the changes in temperature and humidity.

From the comparison of the test results of the liquid crystal display devices 9 and 11, it was found that deformation of the entire liquid crystal display device was suppressed by providing the polycarbonate substrate 7 on the outer surface of the reflector-attached plastic substrate 2. The substrate as the third plastic substrate formed on the outer surface of the reflector-attached plastic substrate 2 is not limited to the polycarbonate substrate 7, but an epoxy substrate, for example, may be used.

Figure 3:
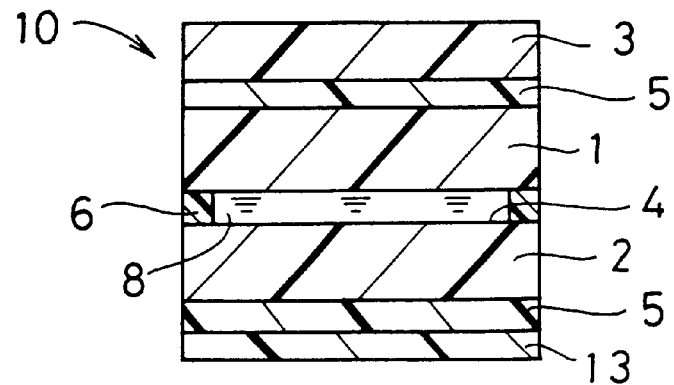
FIG. 3 is a cross-sectional view of a liquid crystal display device of another embodiment of the invention.

FIG. 3 is a cross-sectional view showing the structure of a liquid crystal display device 10 of another embodiment of the invention. In the liquid crystal display device 10 shown in FIG. 3, a polarizing plate 13 is attached to the outer surface of the reflector-attached plastic substrate 2, in place of the polycarbonate substrate 7 in the liquid crystal display device 9 shown in FIG. 1. In FIG. 3, the same components as those of the liquid crystal display device 9 shown in FIG. 1 are denoted by the same reference numerals, and the description thereof is omitted.

The polarizing plate 3 along with the adhesive 5, for example, EG1425DU from Nitto Denko Corp., is attached to the outer surface of the light transmitting plastic substrate 1 so that the polarizing axis thereof is at an angle of 45° with respect to the sides of the liquid crystal display device 10.

To the outer surface of the reflector-attached plastic substrate 2, also, attached is a polarizing plate 13 along with an adhesive 5, which has the same construction as the polarizing plate 3 along with the adhesive 5 attached to the outer surface of the light transmitting plastic substrate 1, for example, EG1425DU from Nitto Denko Corp. so that the polarizing axis thereof is parallel to the direction of the polarizing axis of the polarizing plate 3. It should be noted that the polarizing plate 13 is provided, not for the purpose of polarization, but for suppressing deformation of the liquid crystal display device 10 generated due to the existence of the polarizing plate 3.

The same endurance test is carried out for the liquid crystal display device 10 with the construction described above. First, the liquid crystal display device 10 is placed on a glass plane table with the polarizing plate 13 on the reflector-attached plastic substrate 2 on the bottom, to confirm that the surface is smooth with no bilateral deformation or curling observed. Next, the liquid crystal display device 10 is put in a temperature bath kept at a temperature of 25° C. and a humidity of 60%. After the lapse of 48 hours, the liquid crystal display device 10 is taken out from the temperature bath and placed again on the glass plane table with the polarizing plate 13 on the reflector-attached plastic substrate 2 on the bottom. The height of the polarizing plate 13 from the glass plane table is measured at positions of both ends of a curl.

As a result, the measured values of the height of the polarizing plate 13 from the glass plane table were in the range of 0.1 mm to 0.3 mm, indicating that the curl was small. From the comparison of the measured results of the liquid crystal display device 10 with those of the liquid crystal display device 9 having the polycarbonate substrate 7 and the liquid crystal display device 11 having no polycarbonate substrate, it was found that the curling was extremely small in the liquid crystal display device 10.

The polarizing plate 13 on the reflector-attached plastic substrate 2 has the same construction as the polarizing plate 3 on the light transmitting plastic substrate 1 and is arranged so that the orientation axis direction is parallel to that of the polarizing plate 3. Accordingly, the polarizing plate 13 expands and contracts in the same directions and to the same degree as the polarizing plate 3 with changes in temperature and humidity. Thus, by providing the polarizing plate 13 on the reflector-attached plastic substrate 2, stress acting on the liquid crystal display device 10 from the polarizing plate 3 is cancelled, so that deformation of the liquid crystal display device 10 is suppressed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display device comprising:

a light transmitting first plastic substrate;

a second plastic substrate having a reflective layer formed on a surface thereof;

a liquid crystal layer interposed between said first and second plastic substrates such that the surface of the second plastic substrate having a reflective layer formed thereon faces the first plastic substrate through the liquid crystal layer;

a first polarizing plate including a first polarizing film having a first orientation axis direction formed on the outer surface of said first plastic substrate; and a second plate having polarizing capabilities including a second film having polarizing capabilities formed on the outer surface of said second plastic substrate, said second film having a second orientation axis direction;

wherein said first orientation axis direction of said first polarizing film of said first polarizing plate is parallel to said second orientation axis direction of said second film of said second plate.

2. A liquid crystal display device comprising:

a light transmitting first plastic substrate;

a second plastic substrate having a reflective layer formed on a surface thereof;

a liquid crystal layer interposed between the first and second plastic substrates such that the surface of the second plastic substrate having a reflective layer formed thereon faces the first plastic substrate through the liquid crystal layer;

a polarizing plate having a first orientation axis direction formed on the outer surface of said first plastic substrate; and a third plastic substrate including an oriented film having a second orientation axis direction, said third plastic substrate being formed on the outer surface of said second plastic substrate such that neither said second plastic substrate nor said third plastic substrate are so disposed relative to the other elements of said liquid crystal display device as to function as optical elements thereof;

wherein said second orientation axis direction of said oriented film is parallel to said first orientation axis direction of said polarizing plate.

* * * * *